INVENTORS
THEO BULLINGER
HANNES FEUSZNER

United States Patent Office 3,486,098
Patented Dec. 23, 1969

3,486,098
STEPPING MOTOR WITH START AND STOP STATOR WINDINGS
Theo Bullinger, Weinheim an der Bergstrasse, and Hannes Feuszner, Eiserfeld, Germany, assignors, by mesne assignments, to U.S. Philips Corporation, New York, N.Y., a corporation of Delaware
Filed June 20, 1966, Ser. No. 558,779
Claims priority, application Germany, June 19, 1965, S 97,697
Int. Cl. H02p 1/18, 3/08, 5/06
U.S. Cl. 318—254                    12 Claims

ABSTRACT OF THE DISCLOSURE

A step motor having four rotor poles and eight stator poles. Each stator pole has first and second windings thereon arranged to produce overlapping magnetic fields. All of the first windings are serially connected to form a first winding system and all of the second windings are serially connected to form a second winding system. A commutator disc is mounted on the rotor shaft and synchronously reverses the polarity of the voltage applied to said first and second winding systems. To advance the rotor one step, the commutator reverses the voltage polarity to the first winding system to accelerate the rotor towards the next adjacent stator pole. The rotor swings past said stator pole and at a point between said stator pole and the next stator pole, the commutator reverses the voltage polarity to the second winding system which advances the rotor opposite the last mentioned stator pole.

---

This invention relates to an improved form of step motor. In communication and data-processing technology apparatus operating on the so-called start-stop principle are frequently employed. Punched tapes or punched cards, for example, are often used in punching and read-out devices for controlling teleprinting machines or accounting machines. Between two readings of the data carried out in the rest position, the record carrier is moved on by one step.

Such a start-stop operation is also found in the stepwise movement of the paper carriage or the type basket of typewriters, accounting machines and teleprinters for serial printing operations. For initiating the step, the transport device, for example, the roller of punched-tape devices or the paper carriage in typewriters or accounting machines, is either released so that it can follow a constantly exerted spring force, for example, in the case of a so-called shift lock of a typewriter, or is coupled through an electro-magnetic coupling with a constantly rotating driving motor for a short period of time. The transport device is constantly accelerated until it is stopped abruptly by the action of the shift lock or of the magnetic link. Consequently, the kinetic energy, which constantly increases during the movement, has to be suppressed abruptly. These velocity bounds produce high acceleration and deceleration forces which give rise to an increased wear of the components, to an exposure to shocks (particularly in the case of small, rapidly successive steps) and to noise.

These disadvantages may be avoided in part by using electro-magnetic couplings that provide a sinusoidal acceleration of the transport device during a step. Then one step corresponds to one period. During the first half period the movement is accelerated and during the second half period it is decelerated. In a known magnetic coupling arrangement, such a variation of the acceleration is achieved by means of a subsequent driving gear having a periodically non-uniform transmission. In this arrangement the force of impact is mitigated, it is true, but the step frequency is limited by the subsequent driving gear.

Electromagnetic step motors are also known in which a rotor provided with permanent magnets is rotated stepwise by the change of polarity of the stator field. In these motors, which operate at a very low noise level, the rotor also is abruptly braked at a given instant when it is at maximum speed and has its optimum kinetic energy. Since the deceleration is obtained by magnetic forces oscillation phenomena are unavoidable so that the rotor oscillates into each of the separate step positions. In order to avoid these phenomena, step motors have been designed having a rotor shaft which is provided with shock-absorbing members, for example, a fluid brake, an eddy-current brake or a friction brake. These damping members act upon the rotor shaft not only during the deceleration period, but also during the acceleration period. The step frequency is thus also restricted to a fairly low value.

In communication technology and data processing apparatus, these known step-by-step switching devices could not be employed due to their inertia. Particularly the electric or electronic accounting machines and typewriters require a high step frequency of the paper carriage or of the type basket. However, with respect to the mechanical and electro-mechanical step-by-step operating devices, step motors have the particular advantage that their noise level and wear are slight.

An object of the invention is to provide a step motor having a comparatively high step frequency with a smooth performance of the movements so that it can be advantageously employed for the stepwise control of a device in a start-stop system. According to the invention, this is achieved by associating each of the rotor poles of the step motor with two stator poles. Each stator pole is provided with two windings that produce fields which overlap each other so that they form a magnetic stopping field and a magnetic starting field. Energy is commutated to the windings in synchromism with the rotation of the rotor so that after a change of polarity of one winding system, the rotor pole is attracted by the associated first stator pole and swings beyond the latter. It is subsequently attracted to a second stator pole by a change of polarity of the other winding system that occurs at a predetermined angle of rotation between the associated first and second stator poles. As a result, the acceleration of the rotation of the rotor is approximately sinusoidal during the step. The stator windings may be commutated by means of a commutator disc rigidly fastened to the rotor shaft. The current is derived by means of sliding contacts. The change of polarity of the fields may also be obtained by means of a cam disc which controls sets of contact springs. A contact-free commutation of the stator windings may be obtained by means of electronic switching means which are controlled in synchronism with the rotation of the rotor shaft.

According to a further development of the invention, a change of polarity of the stator windings is performed automatically via the commutator disc in the case of a switching operation of a plurality of steps or in the case of continuous stepping operations, for example, in the printing operation of accounting machines and in a tabulating operation of typewriters, shortly before the rotor pole reaches the associated second stator pole. The essential idea of the invention is that after the beginning of its step, the rotor is subjected to a constantly increasing acceleration by the magnetic force acting thereon. The resultant kinetic energy attains its maximum value at the instant when the rotor pole is just opposite the associated first stator pole. However, this kinetic energy also causes the rotor pole to swing beyond the associated first stator pole. The extent of the overswing depends predominantly upon the magnetic force produced by the associated first stator pole and to a smaller degree upon the friction of the rotor. It can be accurately calculated. During the overswing the kinetic enregy of the rotor is reduced. Shortly before suppression of this kinetic energy, the second stator winding (stopping field) is changed in polarity so that the rotor pole is no longer attracted by the associated first stator pole, but now is attracted by the associated second stator pole. Since the rotor pole is then nearer the associated second stator pole than at the beginning of the step towards the first stator pole, the kinetic energy accumulated therein will no longer be so great. Accordingly, the oscillation phenomena are drastically reduced. Experiments have shown that this oscillation into the stepping position is proportional to the magnitude of the kinetic energy at the instant of repetition of the field commutation. This instant is therefore advantageously chosen so as to lie in the range of the angle of rotation of the rotor in which the kinetic energy of the rotor is approximately neutralized, that is to say when the rotor pole is re-attracted, i.e. in the reverse direction, by the associated first stator pole. At this instant the change of polarity of the field has to be performed. In the second stepping position this gives rise, it is true, to minor oscillation phenomena, but these can be suppressed by means of a rapid action electromagnetic brake controlling the rotor shaft without loss of time.

Therefore, the arrangement according to the invention can be employed quite advantageously in tape punchers and reading devices for punched cards in writing and reading arrangements and serially printed matter in accounting machines. Also, conventional electric typewriters are capable of attaining such high writing rates that, when a braking gear of the type hitherto known is used, the paper carriage is scarcely stopped during writing. Then the separate types are no longer printed at equal distances from each other so that the resultant type character is not entirely satisfactory. In spite of a high step frequency, the use of a step motor according to the invention provides a perfect script.

The invention will now be described more fully with reference to the accompanying drawings in which.

Figure 2:
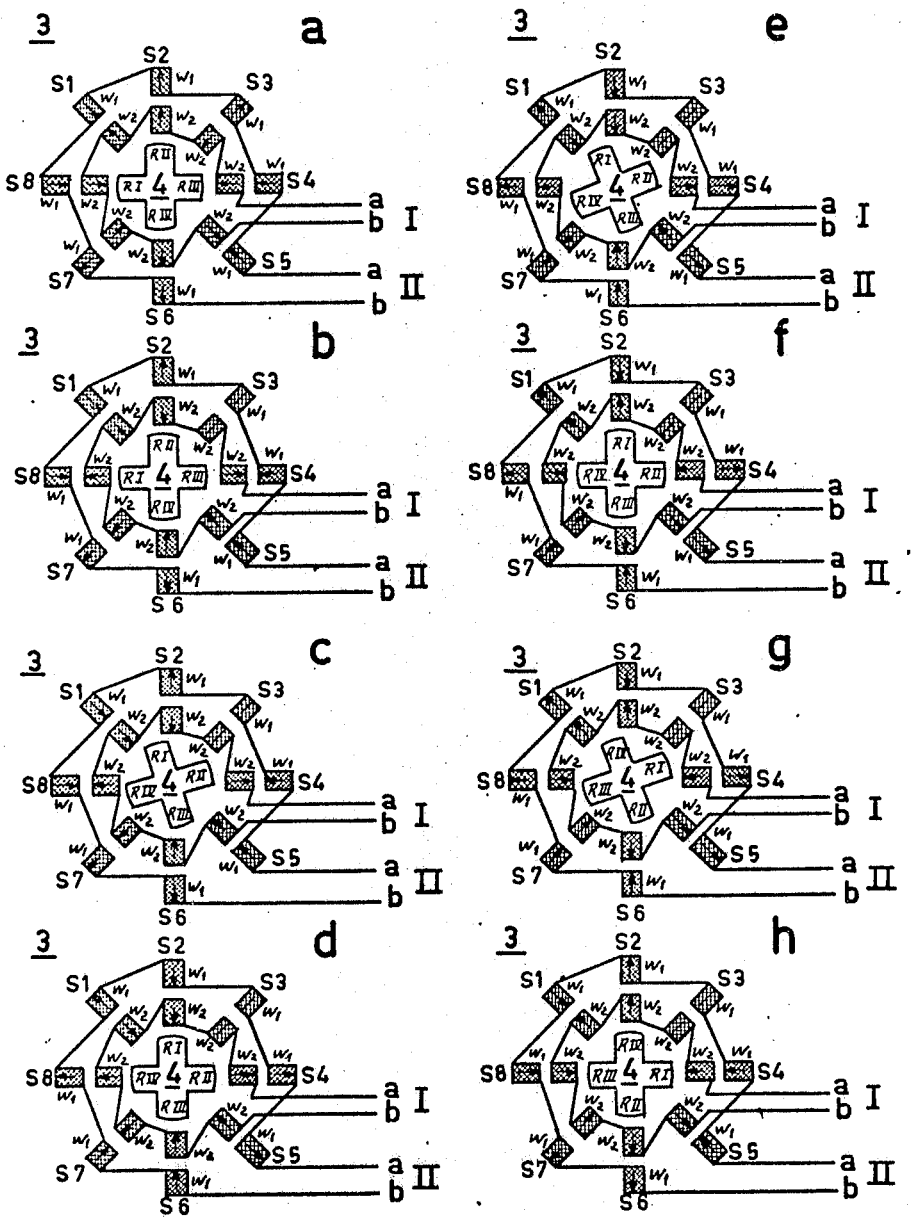
FIG. 2 illustrates the electro-magnetic operation between the rotor and the stator in a step motor according to the invention in separate positions.
Figure 3:
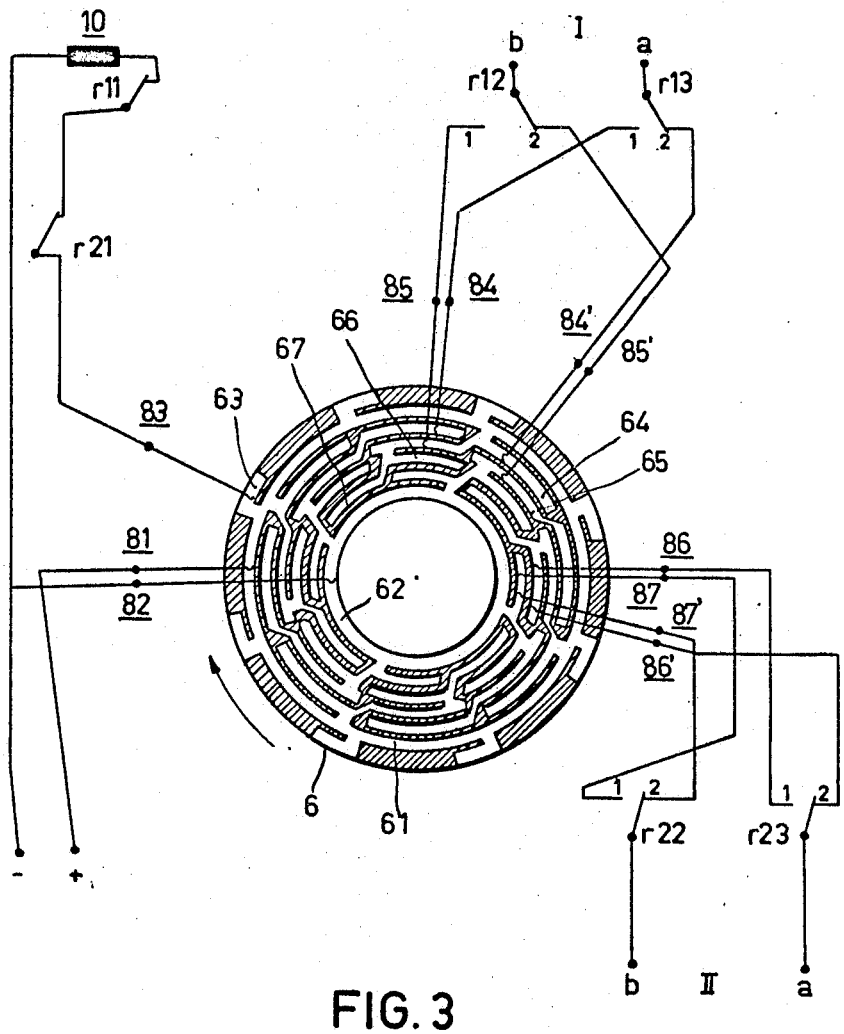
FIG. 3 illustrates the electric control of the field windings of the step motor according to FIG. 2 in dependence upon the rotation of the rotor.

The step motor according to the invention comprises two stationary parts 1 and 2, in which the rotor shaft 5a, 5b is journalled. The distance between the two stationary parts 1 and 2 is determined by the thickness of the stack of laminations forming the stator 3. The stator 3 has eight stator poles evenly distributed along the circumference of the stator. The rotor 4 is provided with four rotor poles designated in FIG. 2 by RI to RIV. In known manner the rotor poles are formed by permanent magnets or by electromagnets, the polarities of which alternate with each other. To the free end 5a of the shaft a commutator disc 6 is rigidly fastened. The disc comprises a plurality of circular electrically conductive paths, the disposition of which is shown in FIG. 3. Brushes 8 cover these paths. The arrangement and the spacing of said brushes from each other is also shown in FIG. 3. The brushes 8 are held in a resilient manner in brush holders 7, which are connected with the stationary part 2 through a ring 12 and spacing sleeves 9a and 9b. The brush holders 7 are slightly displaceable on the ring 12 around the rotor shaft 5 so that the instant of the field commutations of the step motor may be varied. Above the end 5b of the shaft a known electromagnet 10 is connected with the stationary part 1. The armature disc 11 of the magnet is rigidly secured to the rotor shaft 5.

The mode of operation of the step motor according to the invention will now be explained with reference to its use for the stepping movement of the paper carriage of a typewriter. However, the use of the step motor is not restricted thereto, since the step motor may, in general, be employed anywhere for the performance of stepping movements. The movements may also be performed in a plurality of steps. For the purpose referred to, and by way of example, the end 5b of the rotor shaft has secured to it a gear wheel (not shown), by means of which the movement is transmitted to the paper carriage.

The operation of the step motor according to the invention will be described with reference to FIGS. 2 and 3. Each of the stator poles S1 to S8 are provided with two windings $w1$ and $w2$, which are interconnected to produce a starting field I and a stopping field II. The separate windings $w1$ and $w2$ are connected electrically in series in the sense of winding so that the magnetic lines of force (indicated by arrows) directed to the exterior form a magnetic south pole and the lines of force directed towards the rotor 4 form a magnetic north pole. This arrangement is shown arbitrarily. It is essential that the magnetic fields of every second stator pole should be added to each other, whereas those of the intermediate stator poles should neutralize each other.

The step motor is designed so that during one revolution of the rotor 4 it can occupy four stepping positions. FIG. 2a shows the starting position of the motor, FIG. 2b illustrates the starting conditions, FIG. 2c shows the stepping position shortly before the repetition of the polarity inversion of the stator winding II and FIG. 2d shows the second stepping position.

FIGS. 2a, 2b and 2e to 2h show separate phases of the motor in driving via a plurality (here 2) of stepping positions, for example, for jumping from one column to the other on a typewriter.

FIG. 3 is a plan view of the commutator disc 6 and shows the electric circuitry for controlling the motor. The connecting terminals $a$ and $b$ of the starting field I and of the stopping field II are identical to those of FIGS. 2a to 2h. The commutator disc 6, consisting of electrically non-conductive material (indicated by broken lines), comprises two electrically conductive circular paths 61 and 62, which are formed, like the further electrically conductive paths, by printed wiring. These paths cooperate with the sliding contacts 81 and 82 to apply the voltage to the stator windings. The outermost path 63 is connected to the path 61 and, via the sliding contacts 83, switches on the winding of the braking magnet 10 in the stopping positions. The paths 64 to 67 are relatively arranged in a predetermined manner and cooperate with the sliding contacts 84 to 87. In accordance with the angle of rotation of the rotor shaft 5, they commutate the voltage to the stator windings $w1$ and $w2$.

The position of the commutator disc 6 shown in FIG. 3 corresponds to the rotor position in FIG. 2a. For the stator winding $w1$ (stopping field II) the following current circuit is available:

Plus, sliding contact 81, circular path 61, circular path 66, sliding contact 86, contact $r23$, IIa, windings $w1$, IIb, contact $r22$, sliding contact 87, circular path 67, circular path 62, sliding contact 82.

For the stator winding $w2$ (starting field I) there is the current circuit:

Plus, sliding contact 81, circular path 61, circular path 64, sliding contact 84, contact $r13$, Ia, windings $w2$, IB, contact $r12$, sliding contact 85, circular path 65, circular path 62, sliding contact 82.

These current circuits produce in the stator windings $w1$ and $w2$ magnetic fields, the directions of which are indicated in FIG. 2a by the arrows. As a result, south poles are formed at the stator poles S2 and S6 and north poles are formed at the stator poles S4 and S8, whereas the stator poles S1, S3, S5 and S7 are magnetically neutral. If the magnetic poles of the rotor are chosen so that the rotor poles RI and RIII are south poles and the rotor poles RII and RIV are north poles, a stable state is obtained between the rotor and the stator.

At the reception of a step control signal, for example, after reading of a sign stored in a punched tape or after the depression of a sign, the contacts r11, r12, r13, which cooperate with each other, are switched in known manner. Instead of using these contacts, shown as relay contacts, manual switches or electronic switches may be used. When the contact r11 is opened, the current circuit of the braking magnet 10 is interrupted. The armature disc 11, and hence the rotor shaft 5, are released. By switching over the contacts r12 and r13 to the contact side 1, the terminal 1b is connected through the sliding contact 85 to the circular path 65. The circular path 65 is connected to the circular path 61. The terminal Ia, however, is connected through the sliding contact 84 to the circular path 64, which is connected, in turn, to the circular path 62. Thus the direction of current through the windings w2 of the stator 3 is reversed. The resultant magnetic fields are illustrated in FIG. 2b. The stator poles S1 and S5 are then north poles and the stator poles S3 and S7 are south poles, whereas the stator poles acting previously as north poles and south poles are now magnetically neutral. The stator pole S1 then acts upon the south pole RI of the rotor 4 and the stator pole S5 acts upon the south pole RIII of the rotor 4, and so on. These rotor poles are attracted in known manner by the stator poles so that the rotor shaft 5 is caused to rotate. The force then exerted on the rotor shaft can be calculated. Its variation is sinusoidal (positive halfwave). The rotor receives an increasing kinetic energy which is a maximum at the instant when the rotor pole RI or RIII is exactly opposite the stator pole S1 or S5, respectively. Owing to this kinetic energy, the rotor shaft is rotated past the stator poles so that the stator poles then exert a decelerating force on the rotor poles. This decelerating force is also sinusoidal (negative halfwave).

A short time after the rotor has left its starting position, that is to say, as soon as the commutator disc 6 has turned through a predetermined angle, the sliding contacts 84' and 85' will contact the laminations of the circular paths 64 and 65, whereas at the beginning of the stepping operation the sliding contacts 84 and 85 had their positions. At this instant the contacts r11, r12 and r13 can be reset to the starting position shown without involving any variation of the magnetic conditions of the stator windings.

A short time before the braking moment acting on the rotor has neutralised the kinetic energy of the rotor, the rotary movement of the commutator disc 6 has turned the sliding contacts 86' and 87' through more than 45° so that the sliding contact 86' is no longer connected to the circular path 61, but is connected to the circular path 62, whereas the sliding contact 87' is no longer in contact with the circular path 62, but is connected to the circular path 61. This gives rise to a change of polarity in the windings w1 of the stopping field II, and hence of the stator poles S1 to S8, so that the magnetic fields illustrated in FIG. 2d prevail. The rotor pole RI is then attracted by the stator pole S2 operating as a north pole. In this position the current circuit for the braking magnet 10 is closed through the sliding contacts 81 and 83 for the braking magnet 10. The armature disc 11 is attracted to magnet 10 so that the rotor shaft 5 is locked. In this way the motor has performed one step.

If by synchronisation it can be ensured that a reversal of polarity of the stator windings w1 invariably takes place at the instant when the kinetic energy of the rotor shaft 5 (produced during the first half period) has only a predetermined small value, the rotor pole will hardly swing towards the associated second stator pole. In this case the braking magnet 10 may be eliminated.

The step motor according to the invention also is capable of performing a displacement of several steps with constant, increased speed, so that, for example, a tabulator jump of the paper carriage or of the type basket can be performed. For this purpose the motor is started in the manner described above for the step operation (FIGS. 2a and 2b). Also the change of polarity of the field windings takes place at an instant when the rotor pole is located between the associated first and second stator poles, that is to say in its swing-over phase. In contrast to the step operation, however, the change of polarity of the field windings takes place slightly earlier. As will be seen from FIG. 2e, the rotor is in the same position as in FIG. 2c, but the stator field has already changed its polarity.

If a change of polarity should occur at the instant of maximum kinetic energy or at the maximum speed, hence when the rotor pole and the associated first stator pole are just opposite each other, the speed of the rotor would rise to such an extent that the acceleration forces correspond with the frictional forces. Such a process is known in direct current motors. The later change of polarity invariably provides a minimum braking of the rotor so that by a correct choice of the instant of polarity change the acceleration remains zero: $a(\omega t=\pi)=0$. The rotor then maintains its maximum speed provided during the positive half wave of the acceleration. This maximum speed is then equal to double the mean speed.

Figure 1:
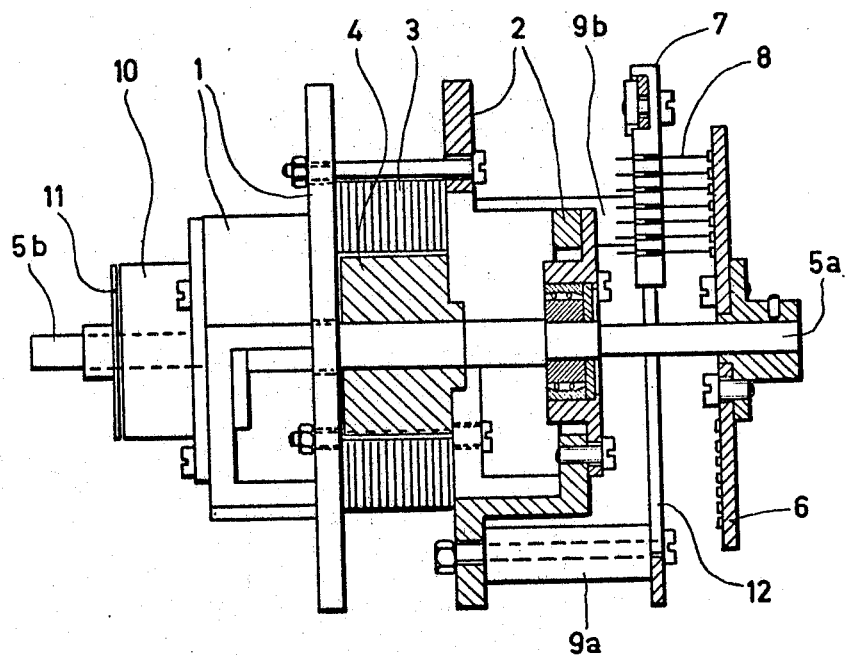
FIG. 1 shows the structural embodiment of a step motor according to the invention.

For this purpose, the contacts r21, r22, and r33, which are always actuated simultaneously, are switched on before the start. These contacts, represented in FIG. 3 by relay contacts, also may be manual switches or electronic switches controlled by a synchronous pulse or a control pulse respectively. Such a pulse may be obtained for example, when an apertured disc is fastened to the rotor shaft, the apertures being scanned by photoelectric cells. By opening the contact r21 the braking magnet 10 is prevented from becoming operative in any possible step position. The commutation of the contacts r22 and r23 to the contact side 1 ensures that the preceding sliding contacts 86 and 87 are operative. The angle between the sliding contacts and the axis of rotation corresponds with the angle through which the polarity change of the field windings occurs earlier than in the step operation. The difference between said two angles determines the increased speed of the rotor as compared with the step operation. The larger this difference, the higher is the speed since the rotor shaft is not braked so strongly due to the smaller overswing. The instant at which the polarity changes, both in uninterrupted operation and in stepping operation, can be adjusted by the adjustment of the brush holders 7 on the ring 12 (FIG. 1) so that small variations of the speed are possible.

If $n$ step positions have to be covered, the commutation of the stator field has to be changed over again to stepping operation a short time before $n-\frac{1}{2}$ stepping positions have been passed. The contacts r21, r22 and r23 have to be reset again to their switching positions. The reversal of the stopping field II is again performed at the later instant, that is to say when the prevailing kinetic energy is neutralized for the major part. This will appear from a comparison of FIG. 2g with FIG. 2e, where at the same rotor position the stator winding has not yet been changed over. FIG. 2h shows the subsequent stopping position of the step motor. It is identical to FIG. 2d with the execption of the step position. The braking magnet 10 is energized through the contact path 63 and the sliding contact 83.

Experiments have shown that with a step motor according to the invention, a switching frequency of 1,500 steps/min. can be readily attained without the accuracy of the stepping positions being adversely affected. The design according to the invention may therefore also be employed with typewriters which are required to provide an accurate type character.

If the step frequency considerably exceeds the above-mentioned value, for example if it is twice as high, the remanence of the braking magnet may be a source of trouble. This can be mitigated by causing a small spring force to act upon the armature disc 11 of the braking magnet 10, said force counteracting the attractive forces of the braking magnet. The value of said counteracting force varies with the value of the remanence.

In the embodiment described above the step motor was assumed to rotate in a clockwise direction. Rotation in counterclockwise direction may be obtained by reversing the rest positions to the contact side 1 instead of on the contact side 2 for the contacts r12, r13 and r22, r23.

What is claimed is:

1. A step motor for apparatus operating on the start-stop principle comprising, a stator including a plurality of stator poles each provided with two windings for producing fields which overlap each other so as to develop a magnetic stopping field and a magnetic starting field, a rotor having a plurality of rotor poles wherein each rotor pole has associated with it two stator poles, means connecting one winding on each of said stator poles together to form a first winding system, means connecting the other winding on each of said stator poles together to form a second winding system, a source of electric energy, commutation means controlled by the rotor rotation and coupled between said energy source and said first and second winding systems so as to energize same in a given sequence such that, after the first winding system has changed its polarity, a given rotor pole is attracted by an associated first stator pole and swings beyond the latter and is attracted to a second stator pole following a subsequent change of polarity of the second winding system that occurs within a predetermined angle of rotation between said associated first and second stator poles, so that during a stepping movement the rotational acceleration of the rotor is approximately sinusoidal.

2. A step motor as claimed in claim 1 wherein said commutation means is arranged to alternately reverse the polarity of the voltage applied to said first and second winding systems so that the associated first stator poles become magnetically operative and the associated second stator poles become magnetically neutral, and vice versa.

3. A step motor as claimed in claim 2 further comprising a shaft for said rotor and wherein said commutation means for the stator windings comprises a control-disc which is rigidly secured to the rotor shaft.

4. A step motor as claimed in claim 3 wherein the control disc, operating as a commutator disc, includes a plurality of conductive control paths along which a plurality of sliding contacts slide.

5. A step motor as claimed in claim 3 wherein for a stepping operation covering several steps or in a continuous stepping operation the change of polarity of the stator windings is produced by the control-disc itself as soon as the rotor pole has reached and swung beyond the associated first stator pole.

6. A step motor as claimed in claim 3 further comprising rotor braking means that includes a member secured to the rotor shaft and an electric braking magnet that is energized via the control-disc as soon as the rotor pole is opposite the associated second stator pole.

7. A step motor comprising, a rotor having a plurality of rotor poles, a source of electric energy, a stator comprising a plurality of stator poles double the number of rotor poles, first and second stator windings on each of said stator poles arranged to produce overlapping magnetic fields, means connecting the first stator windings together and the second stator windings together to form first and second winding systems, respectively, and commutator means intercoupling said energy source with said first and second winding systems and operated in synchronism with said rotor so as to alternately reverse the polarity of the voltages applied to said first and second winding systems, said motor being advanced one step by sequentially reversing the polarity of the voltages applied to said first and second winding systems once per step.

8. A step motor as described in claim 7 wherein said commutator means is arranged to couple the energy source simultaneously to said first and second winding systems so that all of said stator windings are energized simultaneously during a stepping operation.

9. A step motor as described in claim 7 wherein the windings of said first and second winding systems are each connected in series and are wound in a sense so that the magnetic fields produced by the first and second windings on alternate ones of said stator poles substantially neutralize one another for given positions of the rotor.

10. A step motor as described in claim 8 further comprising a shaft for rotating the rotor and wherein said commutator means includes a control disc mechanically coupled to the rotor shaft and arranged to alternately switch the polarity of the voltages applied to said first and second winding systems during mutually exclusive time intervals, the voltage polarity being switched once per step at a point at which the rotor axes lie between adjacent pairs of stator pole axes.

11. A step motor as described in claim 10 wherein the control disc comprises an insulation surface having a plurality of concentric conductive paths arranged thereon, and a plurality of contact members arranged to contact given ones of said conductive paths and connected in a predetermined manner to said energy source and said first and second winding systems.

12. A step motor as described in claim 11 wherein the conductive paths on said disc are arranged as shown in FIG. 3 of the drawing.

References Cited

UNITED STATES PATENTS

| 2,830,246 | 4/1958 | Thomas | 310—49 X |
| 3,042,847 | 7/1962 | Welch | 318—254 |
| 3,239,738 | 3/1966 | Welch | 318—138 |
| 3,325,661 | 6/1967 | Parsons | 310—179 |
| 3,345,547 | 10/1967 | Dunne | 318—138 |
| 3,375,421 | 3/1968 | Ve Nard | 318—18 |
| 3,392,293 | 7/1968 | De Boo et al. | 310—49 |

WARREN E. RAY, Primary Examiner

U.S. Cl. X.R.

310—49, 77, 184; 318—138